L. F. MARTIN.
VEHICLE TIRE.
APPLICATION FILED NOV. 16, 1920.
1,380,820.
Patented June 7, 1921.
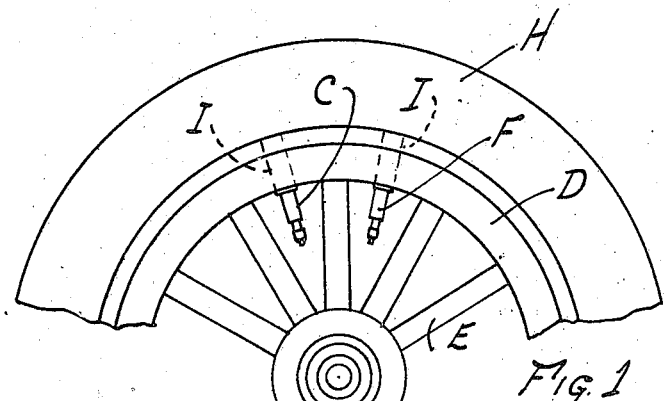
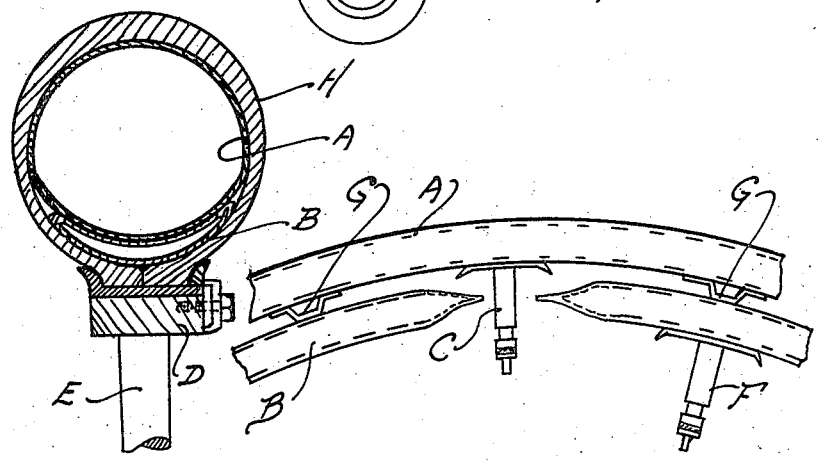
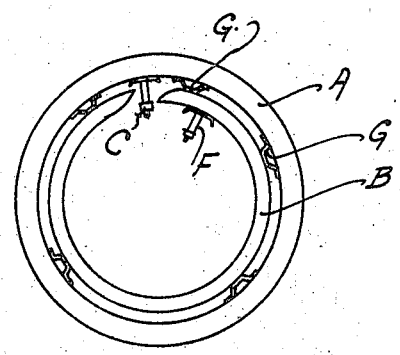
INVENTOR
LOUIS F. MARTIN.
By Bradbury & Caswell
ATTORNEYS.

UNITED STATES PATENT OFFICE.

LOUIS F. MARTIN, OF ST. PAUL, MINNESOTA.

VEHICLE-TIRE.

1,380,820.  Specification of Letters Patent.  Patented June 7, 1921.

Application filed November 16, 1920. Serial No. 424,346.

*To all whom it may concern:*

Be it known that I, LOUIS F. MARTIN, a citizen of the United States, residing at St. Paul, in the county of Ramsey and State of Minnesota, have invented a new and useful Vehicle Tire, of which the following is a specification.

My invention relates to improvements in vehicle tires in which an inner tube is used in an outer casing. The primary object is to provide means which can be readily used in case of a puncture, for continuing the use of the tire without having to repair the punctured tube until desired and without interrupting a trip except to inflate an auxiliary tube which is carried in the casing. My invention, therefore, consists of an auxiliary tube in the casing which can be readily inflated in the event the usual inner tube is punctured. My invention further comprises the features of construction and combination of parts hereinafter described and claimed.

In the accompanying drawing, forming part of this specification, Figure 1 is a side elevation of a portion of an automobile tire and wheel equipped with my improvement; Fig. 2 is a section taken on the line 2—2 of Fig. 1; Fig. 3 is a side elevation of a portion of the inner tube equipment employed with my invention, and Fig. 4 is a side elevation, on a reduced scale of my complete inner tube equipment.

In the drawing, A indicates the usual inner tube and B the auxiliary inner tube which is employed with my improvement. The tube A has the usual valve stem C which projects through the rim D of the wheel E and the auxiliary tube B has a valve stem, similar to valve stem C, also projecting inwardly through rim D. The auxiliary inner tube is split, its ends being placed adjoining either side of the stem C and the auxiliary tube is positioned within the usual inner tube in position where it is less likely to be punctured than the outermost inner tube, it being secured to the inner tube A by means of rubber clips or strips G vulcanized to the adjoining surfaces of the tubes A and B at substantially even intervals circumferentially. In use, the concentrically arranged inner tubes are placed in the outer casing H with the tube A outermost and the valve stems projecting through the openings I in the rim inwardly. After the casing has been properly adjusted and secured on the rim of the wheel, the outer tube A is inflated and used in the usual manner. It is preferable to carry a small amount of air in the auxiliary inner tube to prevent the material of the auxiliary inner tube from becoming creased or vulcanized together and from creeping. In the event of a puncture of the outer tube A, the auxiliary inner tube is immediately inflated by pumping air through its stem F. Thus, the tire can be used while the inner tube A is punctured until it is desired to repair the puncture. While the clips G are shown made out of short strips of rubber vulcanized to the inner tubes A and B for the purpose of keeping the auxiliary inner tube in place and to prevent creeping, it will be understood that any suitable fastening means is contemplated for securing the two inner tubes together, within the spirit of my invention and within the scope of the following claims.

Having described my invention, what I claim as new and desire to secure by Letters Patent is:

1. In combination with the outer casing of a vehicle tire and the rim of a wheel on which said casing is mounted, an endless inner tube occupying the outer portion of the space in said casing and having a valve stem projecting inwardly through the rim of the wheel, and an auxiliary inner tube occupying the inner portion of the space in said casing in position to be inflated in the event the first mentioned inner tube is punctured and having a valve stem also projecting inwardly through the rim of the wheel, said first mentioned valve stem being passed between the adjacent ends of said auxiliary tube.

2. In combination with the outer casing of a vehicle tire and the rim of a wheel on which said casing is mounted, an endless inner tube occupying the outer portion of the space in said casing and having a valve stem projecting inwardly through the rim of the wheel, an auxiliary inner tube occupying the inner portion of the space in said casing in position to be inflated, in the event the first mentioned inner tube is punctured, and having a valve stem also projecting inwardly through the rim of the wheel, said first mentioned valve stem being extended between the adjacent ends of said auxiliary inner tube, and spaced resilient clips joining and having limited contacting areas with said tubes to prevent creeping and to permit ready repair of said tubes at any point.

In testimony whereof, I have signed my name to this specification.

LOUIS F. MARTIN.